US008559894B2

(12) United States Patent
Walker

(10) Patent No.: US 8,559,894 B2
(45) Date of Patent: Oct. 15, 2013

(54) KLYSTRON TRANSMITTER

(75) Inventor: William H. Walker, Madison, AL (US)

(73) Assignee: Baron Services, Inc., Huntsville, AL (US)

( * ) Notice: Subject to any disclaimer, the term of this patent is extended or adjusted under 35 U.S.C. 154(b) by 0 days.

(21) Appl. No.: 13/223,942

(22) Filed: Sep. 1, 2011

(65) Prior Publication Data

US 2013/0055552 A1 Mar. 7, 2013

(51) Int. Cl.
*H04B 1/02* (2006.01)

(52) U.S. Cl.
USPC ............ 455/91; 455/143; 315/5.16; 29/592.1

(58) Field of Classification Search
USPC .................. 29/592.1, 600, 601; 455/91, 143; 315/3.5, 39.3, 5.43-5.47, 505; 342/137, 5, 36 D, 201-202; 330/45, 330/149, 277, 286
See application file for complete search history.

(56) References Cited

U.S. PATENT DOCUMENTS 3,461,401 A * 8/1969 Williams ........................ 331/83
3,904,917 A * 9/1975 Ueda ............................ 315/5.39
4,764,710 A * 8/1988 Friedlander .................. 315/5.43
4,897,609 A * 1/1990 Mallavarpu ..................... 330/43
5,932,972 A * 8/1999 Symons ....................... 315/5.16
6,360,084 B1 * 3/2002 Laquer ............................ 455/91
7,583,222 B2 9/2009 O'Hora et al.
7,592,948 B2 9/2009 Walker
2009/0174596 A1 7/2009 Gekat

* cited by examiner

*Primary Examiner* — Minh Trinh
(74) *Attorney, Agent, or Firm* — Ann I. Dennen; Lanier, Ford Shaver & Payne P.C.

(57) ABSTRACT

A Klystron transmitter for use in weather radar systems has a transmitter module for operating with any of various Klystron tubes designed for different frequency ranges, such as a low S-Band range, a high S-Band range, and a C-Band range. Each of the Klystron tubes is designed to have similar operating characteristics, such as output power and operating voltages. In addition, the transmitter module has driver circuitry for driving the Klystron tube of the transmitter, and such driver circuitry is operable over a wide frequency range so that the same driver circuitry can be used for any of the contemplated bands. Accordingly, the same core transmitter circuitry can be used for any of the Klystron tubes allowing a manufacturer to control which of the contemplated bands is implemented by selecting the appropriate Klystron tube and stable local oscillator (STALO) for the desired band. By using the same core design of the transmitter circuitry for all of the Klystron tubes, the overall manufacturing and implementation costs of Klystron transmitters can be significantly reduced.

5 Claims, 5 Drawing Sheets

KLYSTRON TRANSMITTER

RELATED ART

A weather radar system transmits at a specific frequency, typically between 2.7 Giga-Hertz (GHz) and 3.0 GHz, pulses that reflect from various meteorological scatterers, such as rain, snow, hail, and/or sleet. The weather radar system receives and measures the pulse returns to provide weather data indicative of meteorological events within range of the system. Typically, the weather data is grouped into bins, and each bin is associated with a particular geographic region. In this regard, each bin indicates the measured reflectivity of pulses that are reflected from the associated region, and such measured reflectivity is indicative of the type of meteorological scatterers, if any, within such region.

Many weather radar systems use a Klystron transmitter to generate the pulses used for reflectivity measurements. As known in the art, a Klystron transmitter uses a linear-beam vacuum tube, referred to as a "Klystron," that is used to amplify the pulses for transmission. In general, Klystron tubes allow precise control of output amplitude, frequency, and phase relative to other types of transmitters. In weather applications, Klystron tubes are operated at high power, and the Klystron tube, as well as the circuitry for driving the Klystron tube, are expensive. Techniques for improving performance and reducing the costs of weather radar systems are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally relates to Klystron transmitters for use in weather radar systems. In one exemplary embodiment, a Klystron transmitter has a transmitter module for operating with any of various Klystron tubes designed for different frequency ranges, such as a low S-band between about 2.7 GHz and 3.0 GHz, a high S-band between about 3.4 GHz and 3.7 GHz, and a C-band between about 5.6 and 5.65 GHz. Each of the Klystron tubes is designed to have similar operating characteristics, such as output power and operating voltages. As an example, in one embodiment, each Klystron tube is designed to have the same output power (e.g., about 1 Mega-Watts (MW) or greater) and the same operating voltage (e.g., about 70 kilo-Volts (kV)). In addition, the transmitter module has driver circuitry for driving the Klystron tube of the transmitter, and such driver circuitry is operable over a wide frequency range so that the same driver circuitry can be used for any of the contemplated bands. Accordingly, the same core transmitter circuitry can be used for any of the Klystron tubes allowing a manufacturer to control which of the contemplated bands is implemented by selecting the appropriate Klystron tube and stable local oscillator (STALO) for the desired band. By using the same core design of the transmitter circuitry for all of the Klystron tubes, the overall manufacturing and implementation costs of Klystron transmitters can be significantly reduced.

Figure 1:
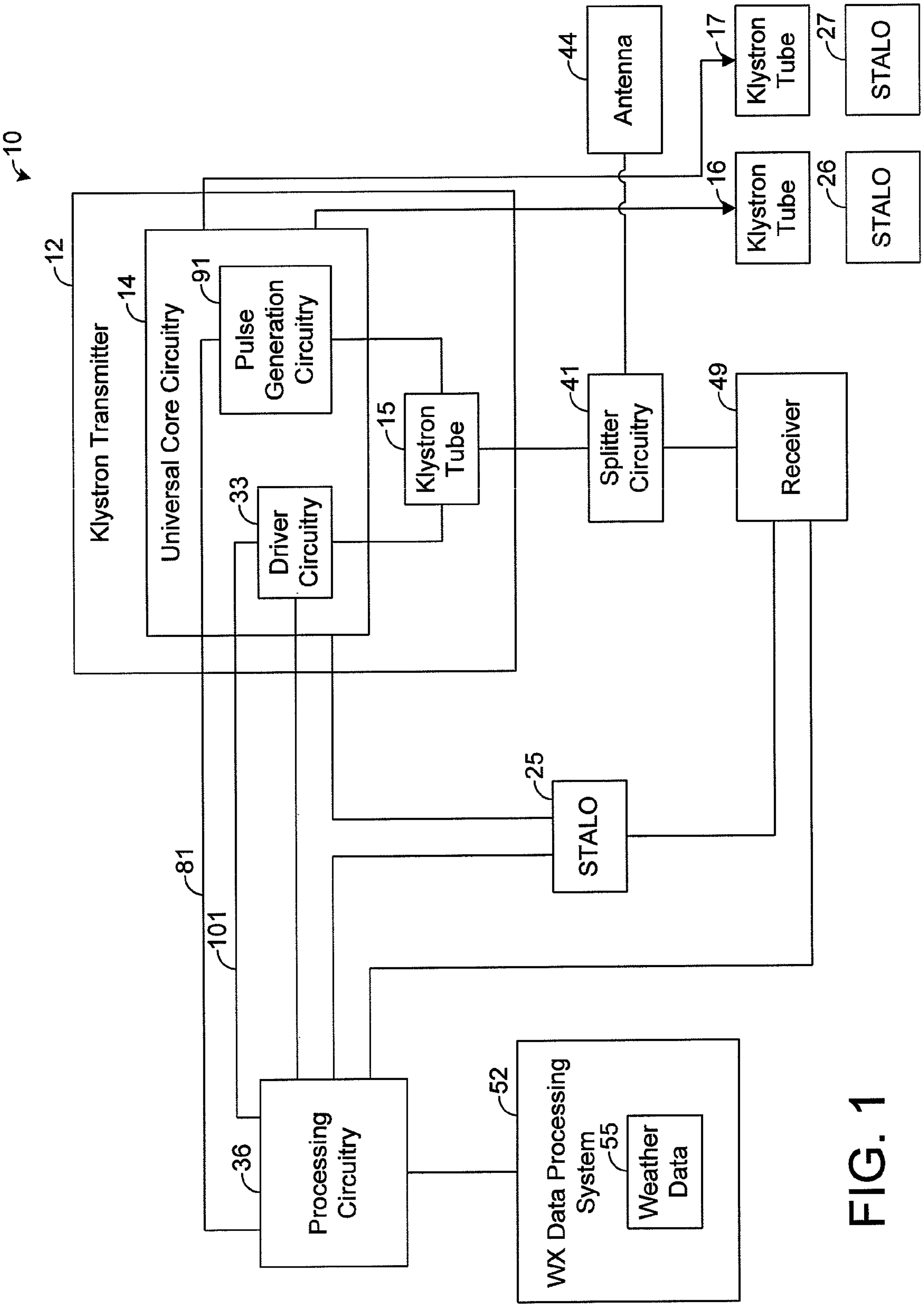
FIG. 1 is a block diagram illustrating an exemplary embodiment of a weather radar system using a Klystron transmitter having universal core circuitry designed for a plurality of frequency ranges, such as a low S-band, a high S-band, and a C-band.

FIG. 1 depicts an exemplary embodiment of a weather radar system 10 employing a Klystron transmitter 12 having universal core circuitry 14 for enabling the transmitter 12 to transmit pulses in any of a plurality of contemplated frequency ranges depending on the type of Klystron tube connected to the circuitry 14, as will be described in more detail hereafter. In one exemplary embodiment, the Klystron transmitter 12 is designed to transmit at any frequency within a low S-band between about 2.7 GHz and 3.0 GHz, a high S-band between about 3.4 GHz and 3.7 GHz, and a C-band between about 5.6 and 5.65 GHz, depending on the type of Klystron tube connected to the circuitry 14.

In this regard, if the transmitter 12 is to be used to transmit pulses in the low S-band, then the universal core circuitry 14 is connected, as shown, to a Klystron tube 15 and a STALO 25 that are both designed for communication in the low S-band. However, if the transmitter 12 is to be used to transmit pulses in the high S-band, then the universal core circuitry 14 is connected to a Klystron tube 16 and a STALO 26 that are both designed for communication in the high S-band in lieu of the Klystron tube 15 and STALO 25 shown by FIG. 1. If the transmitter 12 is to be used to transmit pulses in the C-band, then the universal core circuitry 14 is connected to a Klystron tube 17 and a STALO 27 that are both designed for communication in the C-band in lieu of the Klystron tube 15 and STALO 25 shown by FIG. 1. In other embodiments, other types of Klystron tubes and STALOs may be used to enable the transmitter 12 to transmit pulses in other frequency ranges.

Accordingly, to enable the transmitter 12 to transmit pulses in one of the contemplated frequency ranges (low S-band, high S-band, or C-band), a user connects the universal core circuitry 14 to the appropriate Klystron tube and STALO for communication in the desired frequency range. So connecting the appropriate Klystron tube and STALO configures the transmitter 12 for transmitting pulses in the desired frequency range without requiring the user to make further changes or adjustments to the universal core circuitry 14. In this regard, each Klystron tube 15-17 is designed to have overlapping input characteristics relative to the other Klystron tubes 15-17 so that the universal core circuitry 14 can provide the same operational inputs to any of the Klystron tubes 15-17. As an example, the universal core circuitry 14 may comprise driver circuitry 33 that drives the connected Klystron tube with pulses of the same amplitude and power regardless of which Klystron tube 15-17 and STALO 25-27 are actually connected to the circuitry 14. The universal core circuitry 14 also may be configured to provide the same operating voltage (e.g., about 70 kV) to the connected Klystron tube regardless of which Klystron tube 15-17 and STALO 25-27 are actually connected to the circuitry 14. Further, the universal core circuitry 14 is designed to drive the connected Klystron tube with pulses in any of the contemplated frequency ranges. Thus, a user may change the transmit frequency of the transmitter 12 merely by swapping the connected Klystron tube 15 and STALO 25 with a different Klystron tube (16 or 17) and STALO (26 or 27) designed to operate in a different band.

Referring to FIG. 1, the system 10 has processing circuitry 36 that is configured to generate pulses at a frequency based on the STALO 25 that is connected to the transmitter 12. For example, when the STALO 25 is connected to the transmitter 12, as shown by FIG. 1, the processing circuitry 36 transmits pulses in the low S-band. However, when the STALO 26 is connected to the transmitter 12 instead of the STALO 25, the processing circuitry 36 transmits pulses in the high S-band. Further, when the STALO 27 is connected to the transmitter 12 instead of the STALO 25, the processing circuitry 36 transmits pulses in the C-band. For illustrative purposes, it will be assumed hereafter unless otherwise indicated that the STALO 25 is connected to the transmitter 12, as shown by FIG. 1, such that the processing circuitry 36 transmits pulses in the low S-band.

The pulses generated by the processing circuitry 36 are received and amplified by the driver circuitry 33, which drives the connected Klystron tube 15 with the amplified pulses. In one exemplary embodiment, the Klystron tube 15 amplifies the pulses to a high power state, such as about 1 MW or greater, though other power ranges are possible in other embodiments. The amplified pulses pass through splitter circuitry 41 to antenna 44 from which the pulses wirelessly propagate. As the pulses propagate through the atmosphere, they reflect from objects, such as meteorological scatterers, and return to the antenna 44. The splitter circuitry 41 separates such returns from the pulses output by the Klystron tube 15 and transmits the returns to a receiver 49. Such returns are measured by the processing circuitry 36, and the circuitry 36 processes the returns to define weather data 55 indicative of meteorological events within range of the system 10. Such data is transmitted to a weather data processing system 52, which uses the data for weather applications, such as displaying a radar weather map. Commonly-assigned U.S. Provisional Patent Application No. 61/472,773, entitled "Systems and Methods for Calibrating Dual Polarization Radar Systems" and filed on Apr. 7, 2011, which is incorporated herein by reference, describes exemplary techniques for processing returns and forming weather data.

Note that since the universal core circuitry 14 is operable for any of the contemplated frequency ranges, manufacturing of a large number of Klystron transmitters 12 is facilitated. In this regard, it is unnecessary for a manufacturer to match different Klystron tubes 15-17 with different versions of the core circuitry 14 during manufacturing since the same universal core circuitry 14 can be used with any of the Klystron tubes 15-17. Further, since a larger number of manufactured units will utilize the same parts, better pricing of the parts for the circuitry 14 can likely be obtained. In addition, publishing an operator's manual for the circuitry 14 of the transmitter 12 is simplified since the same version of the core circuitry 14 is used for each transmitter 12. Various other benefits and savings may be realized by using the same universal core circuitry 14 regardless of which contemplated frequency range is desired.

Figure 2:
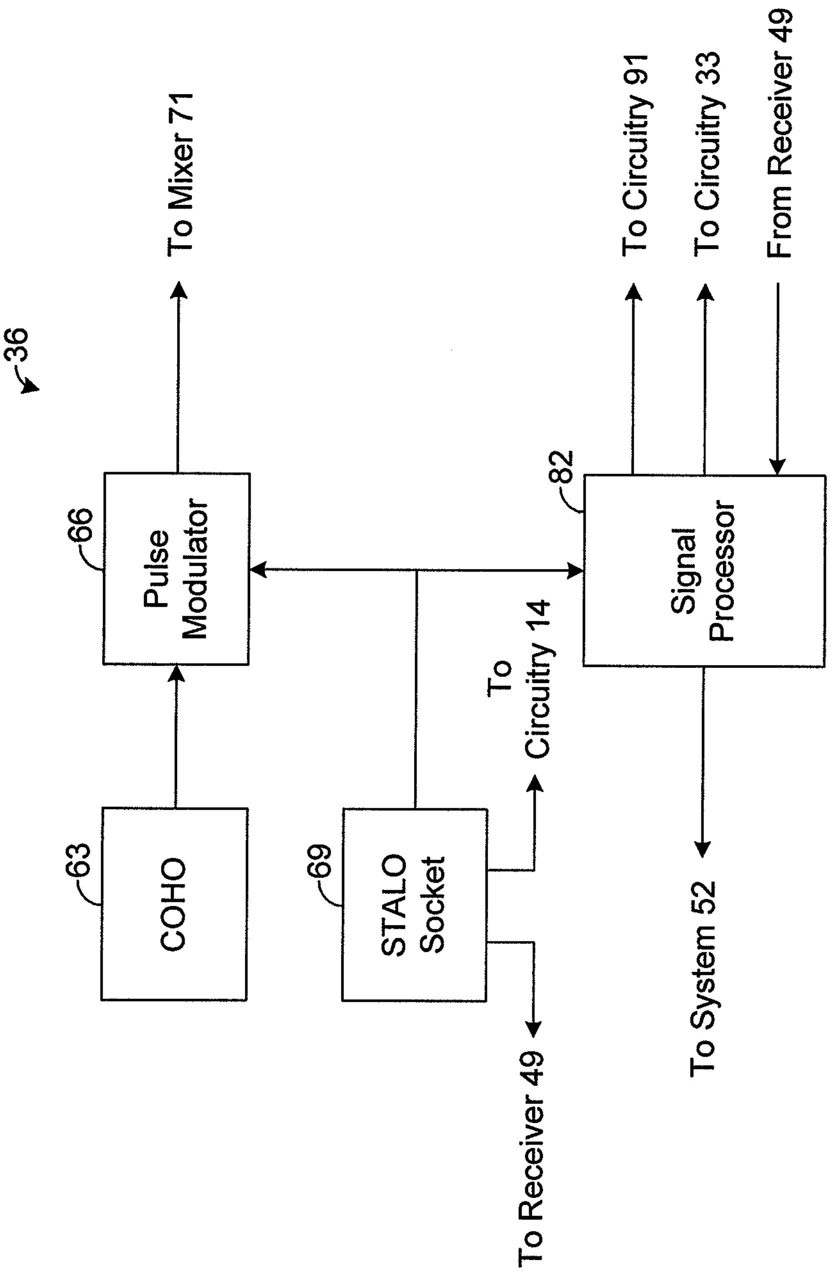
FIG. 2 is a block diagram illustrating an exemplary embodiment of processing circuitry, such as is depicted by FIG. 1.

FIG. 2 depicts an exemplary embodiment of the processing circuitry 36. The processing circuitry 36 comprises a coherent oscillator (COHO) 63 that generates pulses at a specific frequency. For illustrative purposes, assume that the desired transmit frequency for the transmitter 12 is about 3.0 GHz and that the COHO frequency is about 30 Mega-Hertz (MHz), though other frequencies may be used in other embodiments. As shown by FIG. 2, the COHO 63 is coupled to a pulse modulator 66 that receives the pulses generated by the COHO 63. The pulse modulator 66 is configured to perform pulse code modulation to provide a conditioned pulse at the COHO frequency, which is 30 MHz in the current example.

The pulse modulator 66 is coupled to a STALO socket 69, which is configured to receive the STALO 25 (FIG. 1) after the universal core circuitry 14 has been manufactured. Thus, a user may select which STALO 25-27 he or she desires to use based on the desired transmit frequency for the transmitter 12 and plug the selected STALO 25-27 into the socket 69, thereby electrically coupling such selected STALO 25-27 to the universal core circuitry 14, receiver 49, and other components of the processing circuitry 36. The pulse modulator 66 is coupled to a mixer 71 (FIG. 3).

Figure 3:
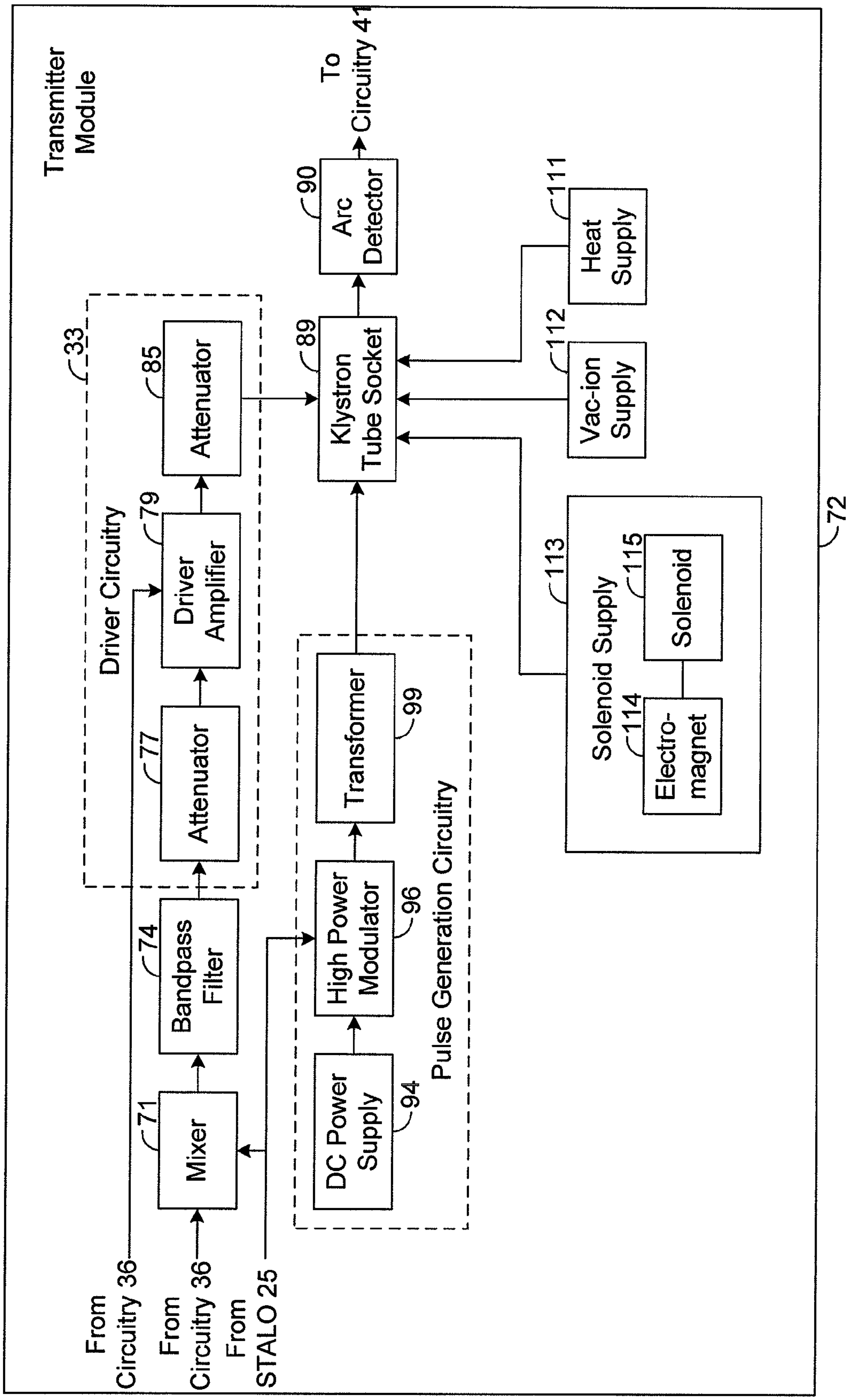
FIG. 3 is a block diagram illustrating an exemplary embodiment of a transmitter module for a Klystron transmitter, such as is depicted by FIG. 1.

FIG. 3 depicts an exemplary embodiment of a transmitter module 72 on which the universal core circuitry 14 resides. Referring to FIG. 3, the mixer 71 mixes the pulses from the modulator 66 (FIG. 2) with pulses generated by the STALO 25 (FIG. 1), which as described above is selected to provide the desired transmit frequency for the transmitter 12. In the current example in which the COHO frequency is about 30 MHz and the desired transmit frequency for the transmitter 12 is about 3.0 GHz, the STALO frequency may be about 2970 MHz. The pulses output by the mixer 71 are at the desired transmit frequency for the transmitter 12 (i.e., 3.0 GHz in the current example).

As shown by FIG. 3, the mixer 71 is coupled to a bandpass filter 74, which filters the pulses output by the mixer 71. In one exemplary embodiment, the filter 74 has a relatively narrow passband, such as about 30 MHz or less centered around the desired transmit frequency (e.g., 3.0 GHz in the current example), but other passbands are possible in other embodiments.

The bandpass filter 74 is coupled to a broadband attenuator 77 of the driver circuitry 33, and the broadband attenuator 77 attenuates the pulses for input to a driver amplifier 79. In one exemplary embodiment, the broadband attenuator 77 is a high-power radio frequency (RF) resistor, but other types of attenuators are possible. The driver amplifier 79 is a broadband device capable of amplifying pulses at least in the contemplated frequency ranges (e.g., at least between 2.7 GHz and 5.65 GHz in the instant embodiment) with sufficient power to drive the Klystron tubes 15-17.

The driver amplifier 79 is coupled via a control line 81 (FIG. 1) to a signal processor 82 (FIG. 2) of the processing circuitry 36, which controls the on/off state of the amplifier 79. In this regard, the signal processor 82 turns on the amplifier 79 just before a pulse arrives at the input of the amplifier 79 and turns off the amplifier 79 just after the pulse leaves the amplifier 79. Accordingly, while a pulse is at the input of the amplifier 79, the amplifier 79 is turned on and amplifies the pulse. However, shortly after a pulse leaves the driver amplifier 79, the amplifier 79 is turned off until just before the arrival of the next pulse. Thus, between pulses, the driver amplifier 79 is prevented from outputting electrical energy.

The output of the driver amplifier 79 is coupled to a broadband attenuator 85, which attenuates the pulses output by such amplifier 79. In one exemplary embodiment, during the time period that a pulse is at the input of the amplifier 79, the amplifier 79 saturates such that the output is at a precise voltage (i.e., the amplifier's saturation voltage). Further, the broadband attenuator 85 attenuates the output of the amplifier 79 such that the output voltage is lowered to a particular voltage within a desired input range for the Klystron tube 15. Note that this voltage is the same regardless of which Klystron tube 15-17 is actually connected to the driver circuitry 33. In one exemplary embodiment, the broadband attenuator 85 is a high-power RF resistor, but other types of attenuators are possible.

As shown by FIG. 3, the broadband attenuator 85 is coupled to a Klystron tube socket 89, which is configured to receive the Klystron tube 15 (FIG. 1) after the universal core circuitry 14 has been manufactured. Thus, a user may select which Klystron tube 15-17 he or she desires to use based on the desired transmit frequency for the transmitter 12 and plug the selected Klystron tube 15-17 into the socket 89, thereby electrically coupling such selected Klystron tube 15-17 to the universal core circuitry 14 and, specifically to at least to the broadband attenuator 85, as well as other components of the transmitter module 72, as will be described in more detail hereafter.

The Klystron tube 15 is configured to amplify the pulse provided by the driver circuitry 33, thereby significantly increasing the pulse's power. As an example, in one exemplary embodiment, the pulse provided by the driver circuitry 33 is about 50 Watts (W), and the Klystron transmitter 15 amplifies the pulse to about 1.0 MW or greater. The other Klystron tubes 16 and 17 are configured to similarly amplify pulses from the driver circuitry 33 to the same power level when either such tube 16 or 17 is used in lieu of the Klystron tube 15.

The Klystron tube socket 89 is coupled to an arc detector 90, which is configured to detect whether there is an arc present in the output of the Klystron tube 15. If such an arc is present, the arc detector 90 turns off the Klystron tube 15 such that it is prevented from operating at least temporarily. The presence of an arc in the tube's output is indicative of an abnormal condition that could damage the Klystron tube 15 or other equipment, and the detector 90 may be configured to provide a warning, such as an audio or visual message, in response to an arc detection.

As shown by FIG. 3, pulse generation circuitry 91 is coupled to the Klystron tube socket 89 and provides electrical power to the Klystron tube 15 through the socket 89. In one exemplary embodiment, the voltage of the power signal supplied by the circuitry 91 is about 70 kV, but other voltages are possible in other embodiments. To provide such a high voltage, the circuitry 91 comprises a direct current (DC) power supply 94 that provides a DC power signal at a specific voltage, such as about 15 kV. The DC power supply 94 is coupled to a high power modulator 96, which modulates the power signal to provide a series of pulses at approximately the same frequency as those amplified by the Klystron tube 15, as will be described in more detail hereafter. The modulator 96 is coupled to a transformer 99, which increases the voltage of the pulses to the desired operating voltage of the Klystron tube 15 (e.g., 70 kV in the instant example).

The modulator 96 is coupled via a control line 101 (FIG. 1) to the signal processor 82 (FIG. 2) of the processing circuitry 36, which controls the modulation performed by the modulator 96. In this regard, the signal processor 82 controls the timing and frequency of the pulses output by the modulator 96 such that these pulses, which control the on/off state of the Klystron tube 15, arrive at the Klystron tube 15 at about the same time as the pulses from the driver amplifier 79. Specifically, a high power pulse from the modulator 96 arrives at and turns on the Klystron tube 15 just before a pulse arrives at the Klystron tube 15 from the driver amplifier 79. Further, the Klystron tube 15 stops receiving the high power pulse from the modulator 96, thereby turning off the Klystron tube 15, just after the Klystron tube 15 stops receiving the pulse from the driver amplifier 79. Accordingly, while a pulse from the driver amplifier 79 is at the input of the Klystron tube 15, the Klystron tube 15 is turned on and amplifies the pulse. However, shortly after a pulse from the driver amplifier 79 leaves the Klystron tube 15, the Klystron tube 15 is turned off until just before the arrival of the next pulse from the driver amplifier 79. Thus, between pulses from the driver amplifier 79, the Klystron tube 15 is prevented from outputting electrical energy.

As shown by FIG. 3, the Klystron tube socket 89 is coupled to a heat supply 111, a vac-ion supply 112, and a solenoid supply 113. The heat supply 111 is configured to provide heat for the Klystron tube 15, and the vac-ion supply 112 is configured to provide a vacuum for the Klystron tube 15. Further, the solenoid supply 113 has an electromagnet 114 that is used to focus the beam of the Klystron tube 15, and the electromagnet 114 operates under the control of a solenoid 115 within the supply 113. In one exemplary embodiment, the power, heat, vacuum, and electromagnetic field respectively provided by the pulse generation circuitry 91, the heat supply 111, the vac-ion supply 112, and the solenoid supply 113 are not dependent on which Klystron tube 15-17 is plugged into the socket 89. Accordingly, any of the Klystron tubes 15-17 may be plugged into the socket 89 without having to adjust the configuration or operation of the pulse generation circuitry 91, the heat supply 111, the vac-ion supply 112, and the solenoid supply 113. In other embodiments, other configurations are possible.

Figure 4:
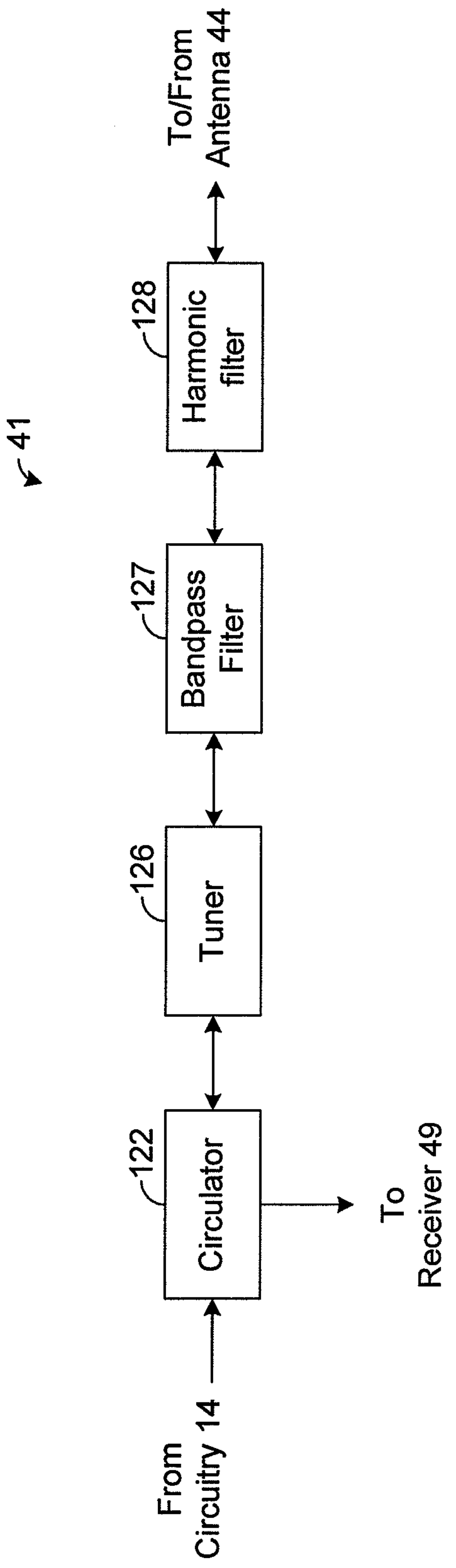
FIG. 4 is a block diagram illustrating an exemplary embodiment of splitter circuitry, such as is depicted by FIG. 1.

FIG. 4 depicts an exemplary embodiment of the splitter circuitry 41. The splitter circuitry 41 comprises a circulator 122 that is coupled to the Klystron tube socket 89 and receives the pulses output by the Klystron tube 15 that is plugged into the socket 89. The pulses pass through the circulator 122 to a tuner 126, a bandpass filter 127, and a harmonic filter 128 before being wirelessly transmitted via the antenna 44 (FIG. 1).

Reflections of the pulses are received by the antenna 44 and pass through the harmonic filter 128, the bandpass filter 127, and the tuner 126 to the circulator 122. The circulator 122 separates the reflections from the pulses output by the Klystron tube 15. Such reflections are transmitted to the receiver 49, which filters and processes the reflections before they are received by the signal processor 82 (FIG. 2). The signal processor 82 then uses the received reflections to define the weather data 55.

As described above, either of the Klystron tubes 16 or 17 may be used in lieu of the Klystron tube 15. Further if the Klystron tube 16 is used, the STALO 26 associated with such tube 16 is preferably used in lieu of the STALO 25. If the Klystron tube 17 is used, the STALO 27 associated with such tube 17 is preferably used in lieu of the STALO 27. In such embodiments, the operation of the transmitter 12 is the same as that described above except that pulses are generated at a different frequency. For example, if the Klystron tube 16 and STALO 26 are used, then pulses in the high S-band are generated. If the Klystron tube 17 and STALO 27 are used, then pulses in the C-band are generated.

In the embodiments described above, the Klystron tubes 15-17 (and associated STALOs 25-27) are configured for operation in the bands of 2.7 to 3.0 GHz (low S-band), 3.4 to 3.7 GHz (high S-band), and 5.6 to 5.65 GHz (C-band), respectively. In other embodiments, other frequency ranges are possible. As a mere example, in one exemplary embodiment, the Klystron tubes 15-17 (and associated STALOs 25-27) are configured for operation in the bands of 2.7 to 2.9 GHz (low S-band), 3.6 to 3.7 GHz (high S-band), and 5.6 to 5.65 (C-band), respectively. Such bands may be less susceptible to interference and, thus, provide better overall performance.

In this regard, the band from about 3.0 GHz to about 3.7 GHz is generally reserved for military operation. However, the band from about 3.4 GHz to about 3.7 GHz is not currently used by the military at least to a significant extent, and it is possible that the military would grant a petition to use such band for weather radar applications. However, limiting the low S-band to less than 2.9 GHz and the high S-band to greater than 3.6 GHz provides guard-bands that help to separate the pulses generated by the transmitter 12 from the signals currently used by the military from about 3.0 GHz to about 3.4 GHz. Accordingly, the pulses generated by the transmitter 12 are less susceptible to interference by the military signals and also less likely to interfere with the military signals. Yet other bands are possible in other embodiments.

An exemplary method of manufacturing a batch of Klystron transmitters 12 for use in weather radar systems will be described in more detail below with reference to FIG. 5. For illustrative purposes, assume that each Klystron transmitter 12 in the manufactured batch is to be manufactured for transmission in a respective band selected from three contemplated frequency ranges: low S-band between 2.7 and 2.9 GHz, a high S-band between 3.6 and 3.7 GHz, and C-band between 5.6 and 5.65 GHz. In other embodiments, other frequency ranges are possible.

Figure 5:
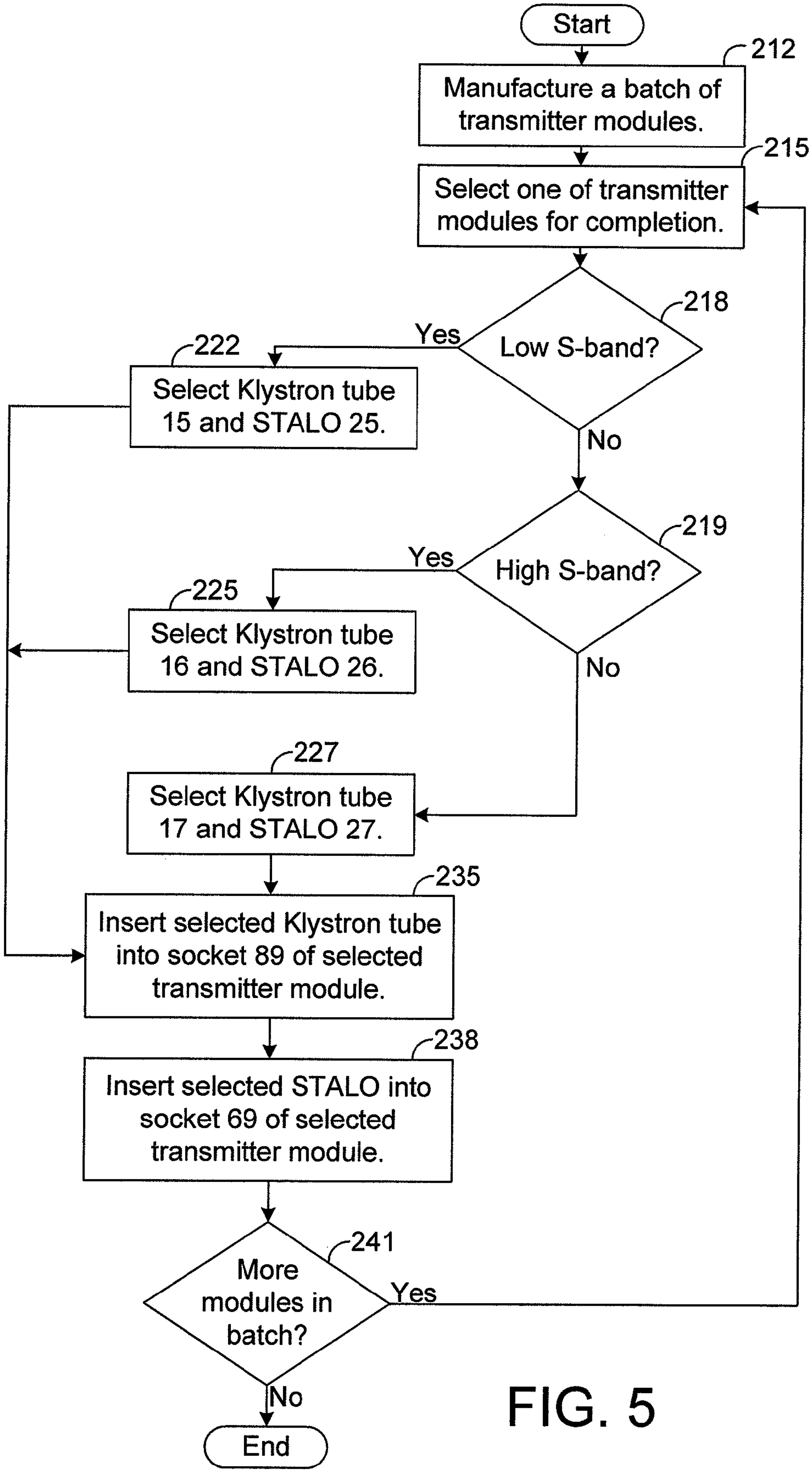
FIG. 5 is a flow chart illustrating an exemplary method of manufacturing a batch of Klystron transmitters for use in weather radar applications.

As shown by block 212 of FIG. 5, a batch of Klystron transmitter modules 72 are manufactured without a Klystron tube for the socket 89 or a STALO for the socket 69. Each such module 72, however, has the universal core circuitry 14 shown by FIG. 3.

As shown by block 215 of FIG. 5, one of the transmitter modules 72 is selected for completion. In block 218, a determination is made whether the selected transmitter module 72 is to transmit pulses in the low S-band. If so, a Klystron tube 15 and STALO 25, which are designed for communication in the low S-band, are selected as shown by block 222. If the transmission band of the selected transmitter module 72 is not the low S-band, then a determination is made whether the selected transmitter module 72 is to transmit pulses in the high S-band, as shown by block 219. If so, a Klystron tube 16 and STALO 26, which are designed for communication in the high S-band, are selected as shown by block 225. If the transmission band of the selected transmitter module 72 is not the low S-band or the high S-band, then the selected transmitter module 72 is to transmit pulses in the C-band since the other contemplated bands have been eliminated in the selection process. In such case, a Klystron tube 17 and STALO 27, which are designed for communication in the C-band, are selected as shown by block 227. Note that the determinations in blocks 218 and 219 may be based on a customer order specifying the desired transmission band for a completed transmitter 12.

As shown by blocks 235 and 238, the selected Klystron tube is inserted into the Klystron tube socket 89 of the selected transmitter module 72, and the selected STALO is inserted into the STALO socket 69 of the selected transmitter module 72. At this point, the manufacturing of a Klystron transmitter 12 is complete, and a determination is made whether there are any more transmitter modules 72 in the batch that have yet to complete the manufacturing process, as shown by block 241. If so, another transmitter module 72 in the batch is selected for completion, and the process of selecting a suitable Klystron tube and STALO for this other transmitter module 72 is repeated.

Now, therefore, the following is claimed:

1. A Klystron transmitter, comprising:

a first Klystron tube for amplifying pulses in a first band; and universal core circuitry having a driver amplifier, an attenuator, a Klystron tube socket, and a stable oscillator (STALO) socket, the universal core circuitry compatible with a first STALO for oscillating in the first band, a second STALO for oscillating in a second band, a third STALO for oscillating in a third band, the universal core circuitry configured for connection to a second Klystron tube for amplifying pulses in the second band, and a third Klystron tube for amplifying pulses in the third band, wherein the driver amplifier is coupled to the attenuator, wherein the first Klystron tube is inserted into the Klystron tube socket, wherein the first STALO is inserted into the STALO socket, wherein the driver amplifier is configured to drive the first Klystron tube with pulses received from the first STALO, wherein the pulses received from the first STALO pass through the attenuator and are compatible with each of the first, second, and third Klystron tubes, wherein the Klystron transmitter is capable of transmitting pulses in the second band by replacing the first Klystron tube with the second Klystron tube and by replacing the first STALO with the second STALO, wherein the Klystron transmitter is capable of transmitting pulses in the third band by replacing the first Klystron tube with the third Klystron tube and by replacing the first STALO with the third STALO, wherein the first, second, and third bands are non-overlapping, wherein one of the bands is between 2.7 Giga-Hertz and 3.0 GHz, wherein one of the bands is between 3.4 GHz and 3.7 GHz, and wherein one of the bands is a C-band.

2. The transmitter of claim 1, wherein an output power of the first Klystron tube is at least 1.0 Mega-Watts.

3. The transmitter of claim 1, wherein the C-band is between 5.6 and 5.65 GHz.

4. The transmitter of claim 1, wherein the second S-band is between 3.6 and 3.7 GHz.

5. The transmitter of claim 4, wherein the first S-band is between 2.7 and 2.9 GHz.

* * * * *